United States Patent [19]

Jundt et al.

[11] Patent Number: 4,897,631

[45] Date of Patent: Jan. 30, 1990

[54] CONTROL APPARATUS

[75] Inventors: Werner Jundt, Ludwigsburg; Wolfgang Kosak, Möglingen, both of Fed. Rep. of Germany

[73] Assignee: Robert Bosch GmbH, Stuttgart, Fed. Rep. of Germany

[21] Appl. No.: 186,909

[22] Filed: Apr. 27, 1988

[30] Foreign Application Priority Data

Apr. 29, 1987 [DE] Fed. Rep. of Germany ....... 3714194

[51] Int. Cl.⁴ ......................... B60Q 1/00; G11C 7/00
[52] U.S. Cl. .................................... 340/438; 340/333; 340/635; 340/653; 340/693; 307/10.7; 365/228; 364/187; 364/246.6; 364/424.03; 364/431.11

[58] Field of Search ............... 340/52 F, 52 R, 693, 340/653, 635, 333; 365/228, 229; 364/184, 187, 246.6, 246.9, 246.92, 424.03, 424.04, 431.11, 431.12; 123/479, 480, 179 R; 307/10 BP

[56] References Cited

U.S. PATENT DOCUMENTS 4,277,772  7/1981  Kastura et al. ................... 340/52 F
4,667,176  5/1987  Matsuda ............................ 340/52 F Primary Examiner—Donnie L. Crosland
Attorney, Agent, or Firm—Walter Ottesen

[57] ABSTRACT

A control apparatus with connecting terminals which are in part connected to serve a plurality of functions. The control apparatus has at least one memory and can be especially for a control apparatus of an electronic internal combustion engine control wherein an additional voltage source for the memory is provided via at least one output terminal accommodating at least one function.

3 Claims, 1 Drawing Sheet

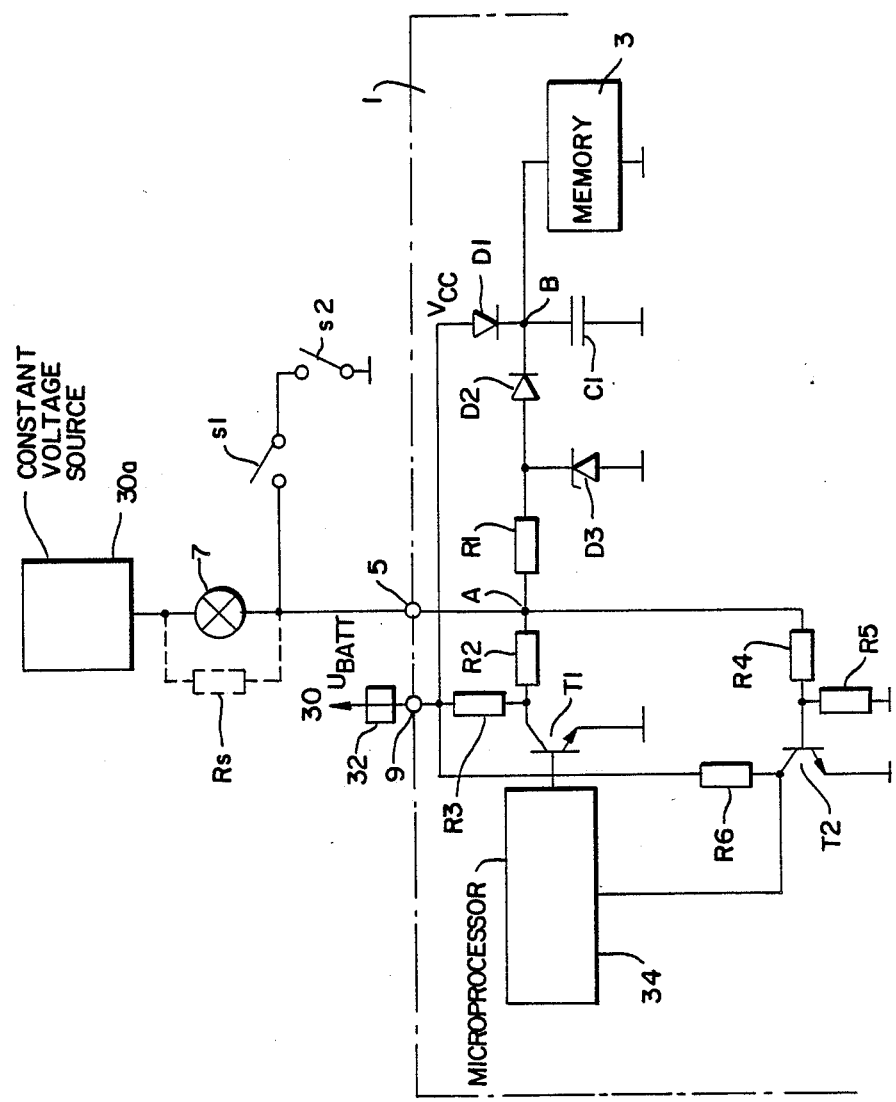

4,897,631

CONTROL APPARATUS

FIELD OF THE INVENTION

The invention relates to a control apparatus such as for the internal combustion engine of a motor vehicle. The control apparatus includes a plurality of connecting terminals of which a portion serves several functions. The control apparatus also includes at least one memory and can be part of the electronic control arrangement for an internal combustion engine.

BACKGROUND OF THE INVENTION

Control apparatus having a memory configured as a RAM are known. The voltage supply for the memory must be maintained even when the control apparatus is switched off if the memory is to serve as a permanent store. Accordingly, known control apparatus having a permanent memory are provided with an additional connecting terminal by means of which they are supplied with voltage when the control apparatus is switched off. The disadvantage of these control apparatus is that an additional connecting terminal must be provided for this purpose or one of the available connecting terminals must be kept free for this purpose which has a disadvantageous effect when the control apparatus is to take over so many functions that all available terminals must at least in part be utilized to accommodate several functions.

SUMMARY OF THE INVENTION

The control apparatus according to the invention affords the advantage with respect to the control apparatus described above that connecting terminals utilized for several purposes can nonetheless realize an additional function. In this way, the possible functions of the control apparatus are fully utilized while at the same time the information stored in the memory (RAM) is also maintained when the control apparatus is switched off, that is, when it is separated from the supply voltage.

The control apparatus according to the invention can be for an internal combustion engine in a motor vehicle. The control apparatus includes voltage supply means for supplying a voltage; switching means for connecting and disconnecting the voltage to and from the control apparatus; the control apparatus having a plurality of connecting terminals for accommodating a plurality of functions; a circuit component for performing one of the functions, the circuit component being connected between one of the terminals and the voltage supply means; a memory for storing information therein which should not be lost when the switching means is actuated to disconnect the voltage from the control apparatus; and, circuit means connected between the one terminal and the memory for supplying the voltage to the latter via the circuit component when the switching means is actuated to disconnect the voltage from the control apparatus.

It is especially advantageous that a connecting terminal already utilized for several functions can take on an additional function by means of which the number of connecting terminals and the lines leading to the control apparatus are maintained constant.

BRIEF DESCRIPTION OF THE DRAWING

The invention will now be described with reference to the single figure of the drawing which shows a circuit diagram in which parts of a control apparatus and an indicating component driven by the control apparatus are shown.

DESCRIPTION OF THE PREFERRED EMBODIMENTS OF THE INVENTION

A control apparatus 1 of an electronic engine control system of a motor vehicle is shown in the figure by means of the broken line. The control apparatus 1 includes a memory 3 configured as a RAM. On the one hand, the memory 3 is connected to ground while on the other hand, it is connected with an internal voltage supply $V_{CC}$ of the control apparatus via a diode D1. The voltage supply $V_{CC}$ of the control apparatus is +5V, for example, with the diode D1 being poled so that its cathode is connected to the memory 3.

The cathode of a second diode D2 is connected to the cathode of D1. The anode of diode D2 is connected to ground through a Zener diode D3 and to a circuit node A via a resistor R1. One terminal of capacitor C1 is connected to the circuit node B at which the diodes D1 and D2 are connected to each other. The other terminal of capacitor C1 is connected to ground.

The circuit node A is connected with a first connecting terminal 5 of the control apparatus 1. A lamp 7 functioning as an indicating component is connected to connecting terminal 5 at one end thereof. At its other circuit end, the lamp 7 is connected to a constant voltage such as directly to the battery voltage $U_{BATT}$ or the terminal 30a of a motor vehicle. A resistance Rs is connected in parallel to the lamp 7 and is shown in phantom outline.

A first closure contact s1 is connected to the first connecting terminal 5 and a second closure contact s2 is connected in series with the first closure contact s1. The second closure contact s2 is connected to ground at the end thereof facing away from the first closure contact s1.

A second connecting terminal 9 of the control apparatus 1 is connected to a voltage $U_{BATT}$ such as terminal 30. The voltage $U_{BATT}$ is switched on and off by means of the ignition key of the motor vehicle represented in the drawing by the block 32.

The collector of a first transistor T1 is connected with circuit node A via resistor R2 and with a second connecting terminal 9 via a resistor R3. The emitter of the transistor T1 is connected to ground while the base thereof is driven by a microprocessor 34 of the control apparatus 1.

A further resistor R4 is connected with one of its terminals to the circuit node A. With the other one of its terminals, resistor R4 is connected to the base of a second transistor T2 and to a resistor R5 connected to ground. The emitter of this transistor T2 is likewise connected to ground and its collector is connected to the internal supply voltage $V_{CC}$ of the control apparatus 1 via a resistor R6. The internal supply voltage $V_{CC}$ can be +5, for example. A connection to the microprocessor 34 of the control apparatus 1 is provided from the collector of the transistor T2.

The operation of the control apparatus will now be described with reference to the drawing.

The lamp 7 serves as an indicating component and is a lamp for monitoring and indicating quantities relevant to exhaust gas. The lamp 7 is a so-called CARB-lamp.

During operation of the motor vehicle, the control apparatus 1 is connected via a second connecting terminal 9 with the voltage $U_{BATT}$ applied to the terminal 30 and the memory 3 is connected via an internal voltage supply with the voltage $V_{CC}$. A blinking signal in the form of a blink code is provided by the lamp 7 to indicate a defect. For this purpose, the first transistor T1 serves as a lamp driver and is driven by the microprocessor 34 such that the circuit node A is connected to ground through resistor R2 and the lamp 7 connected to the first connecting terminal 5 is illuminated. The drop in voltage at the circuit node A does not affect the voltage supply of the memory 3. The memory 3 remains connected via the diode D1 to the voltage supply $V_{CC}$ while the diode D2 is blocked. Accordingly, the information stored in memory 3 is maintained.

If the vehicle is parked and the ignition key withdrawn, the terminal 30 and therefore the second connecting terminal 9 is without voltage, that is, the internal voltage supply of the memory 3 is also interrupted. The voltage supply of the memory 3 is maintained for a transition time by the buffer capacitor C1 which serves as a voltage stabilizer.

It is most important with respect to the circuit shown in the figure that the lamp 7 is connected to a constant voltage such as to constant voltage source 30a by means of which the voltage supply can be then maintained even when the supply of other components of the motor vehicle and that of the control apparatus 1 is interrupted by withdrawing the ignition key. The data stored in the memory 3 is maintained in this way in that the voltage supply in this situation comes from the terminal 30a via the lamp 7, the resistor R1 and the diode D2. The voltage is limited by the Zener diode D3 and is smoothed by means of the capacitor C1.

The voltage supply of the memory 3 can not be guaranteed in the event that the lamp 7 becomes defective. This however is not damaging since then no blink codes for indicating a failure can be provided.

When defects are to be read out of the control apparatus 1 via a serial interface independently of lamp 7, the resistance Rs can be provided in order to guarantee the voltage supply of the memory 3 even when the lamp 7 is defective. The resistance Rs can be connected in parallel to the lamp or, for example, can be provided in the cable harness of the motor vehicle.

A diagnosis of the control apparatus 1 can be additionally initiated via the first connecting terminal 5. For this purpose, the closure contacts s1 and s2 are closed and the first connecting terminal 5 is connected to ground. The voltage supply of the memory 3 is maintained by the internal voltage supply via the diode D1.

The second transistor T2 is assigned to an input stage of the microprocessor of the control apparatus. The second transistor T2 is rendered conductive by means of a voltage drop at the first connecting terminal 5 and at the circuit node A and a signal is supplied to the microprocessor whereupon a diagnosis is carried out.

The initiating signal for the diagnosis is, for example, initiated by pressing the key corresponding to the second closure contact s2. The first closure contact s1 is driven by a relay, for example, which is connected, for example, to the terminal 5 and is only then supplied with voltage when the ignition key is actuated. By means of this contact, an inadvertent interruption of the voltage supply of the memory 3 via the lamp 7 and thereby a loss of the contents of the memory is prevented. During the time that the motor vehicle is parked and the control apparatus 1 is switched off, the first connecting terminal 5 is not connected to ground by actuating the key assigned to the second closure contact s2.

From the foregoing, the situation results that a connecting terminal of the control apparatus, which in this case already has two functions assigned thereto, can take on a further function. Up till now, the lamp 7 was driven via the first connecting terminal to indicate failure signals and initiate a diagnosis of the control apparatus 1. With the aid of the invention, it is possible now to supply the memory 3 with voltage also when the control apparatus 1 is switched off via this terminal and thereby maintain the information stored therein.

It is understood that the foregoing description is that of the preferred embodiments of the invention and that various changes and modifications may be made thereto without departing from the spirit and scope of the invention as defined in the appended claims.

What is claimed is:

1. A control apparatus such as for an internal combustion engine in a motor vehicle, the control apparatus comprising:

said control apparatus having a plurality of connecting terminals for accommodating a plurality of functions;

voltage supply means for supplying a voltage to a first one of said terminals;

switching means for connecting and disconnecting said voltage to and from said first one of said terminals of said control apparatus;

a circuit component for performing one of said functions, said circuit component being connected between a second one of said terminals and said voltage supply means so as to cause a voltage to be applied to said second terminal;

a memory for storing information therein which should not be lost when said switching means is actuated to disconnect the voltage from said control apparatus at said first terminal; and, circuit means connected between said second terminal and said memory for supplying the voltage on said second terminal to said memory when said switching means is actuated to disconnect said voltage on said first one of said terminals from said control apparatus thereby preventing the information in said memory from becoming lost.

2. A control apparatus such as for an internal combustion engine in a motor vehicle, the control apparatus comprising:

voltage supply means for supplying a voltage;

switching means for connecting and disconnecting said voltage to and from said control apparatus;

said control apparatus having a plurality of connecting terminals for accommodating a plurality of functions;

a circuit component for performing one of said functions, said circuit component being connected between one of said terminals and said voltage supply means;

a memory for storing information therein which should not be lost when said switching means is actuated to disconnect said voltage from said control apparatus;

circuit means connected between said one terminal and said memory for supplying said voltage to the latter via said circuit component when said switching means is actuated to disconnect said voltage from said control apparatus; and, said circuit component being an indicating component; said control apparatus further comprising drive means for transmitting a drive signal to drive said indicating component via said one terminal.

3. The control apparatus of claim 2, said indicating component being a control lamp and said voltage supply means including ancillary voltage source means for supplying an independent ancillary voltage to said control apparatus via said one terminal and said circuit means when said switching means is switched to disconnect said control apparatus from said voltage of said voltage supply means.

* * * * *